United States Patent Office 3,381,014
Patented Apr. 30, 1968

3,381,014
PROCESS FOR PRODUCING PYRIDOXINE AND NOVEL INTERMEDIATES THEREOF
Elbert E. Harris, Dale W. Rosenburg, and Earl M. Chamberlin, Westfield, N.J., assignors to Merck & Co., Inc., Rahway, N.J., a corporation of New Jersey
No Drawing. Filed Dec. 30, 1965, Ser. No. 517,836
11 Claims. (Cl. 260—294.9)

This invention relates to a new process for the preparation of vitamin $B_6$. More particularly, it is concerned with a process for the preparation of an oxygen bridged precursor of 2-methyl-3-(cyano or hydrocarbonoxy)-4,5-disubstituted pyridine by the reaction of a 4-methyl-5-(cyano or hydrocarbonoxy)-oxazole with 2,5-dihydrocarbonoxy-2,5-dihydrofuran. It is also concerned with the conversion of this new bridged oxygen intermediate to 2-methyl-3-hydroxy-4,5-pyridine dicarboxaldehyde and the further conversion of this latter compound to pyridoxine.

The preparation of pyridoxine by the reaction of oxazoles with dienophiles to produce pyridine intermediates and subsequent conversion of these intermediates to pyridoxine by several methods has been described in the art. However, many of these processes involve a multiplicity of steps and require many reactants. Also, many of the pyridine intermediates are difficult to convert to vitamin $B_6$. Thus, other processes more suitable for the preparation of vitamin $B_6$ have been sought.

It is an object of this invention to provide an improved process for the preparation of vitamin $B_6$. It is a further object of this invention to provide a new bridged oxygen precursor of 2-methyl-3-(cyano or hydrocarbonoxy)-4,5-disubstituted pyridine which can be converted to 2-methyl-3-hydroxypyridine-4,5-dicarboxaldehyde by an acidic hydrolysis. Another object of this invention is to provide a method of converting the 2-methyl-3-hydroxypyridine-4,5-dicarboxaldehyde to vitamin $B_6$ by hydrogenation or by reduction with various reducing agents. A still further object of this invention is to provide a new bridged oxygen precursor of 2-methyl-3-(cyano or hydrocarbonoxy)-4,5-disubstituted pyridine and method for preparing this compound. Other objects will become apparent from the detailed description of this invention hereinafter provided.

In accordance with the present invention, it is now found that pyridoxine can be readily and conveniently produced by reacting a 4-methyl-5-cyano oxazole or a 4-methyl-5-hydrocarbonoxy oxazole with various 2,5-dihydrocarbonoxy-2,5-dihydrofuran compounds to produce a 4,7-epoxy-7-(cyano or hydrocarbonoxy)-1,3-dihydrocarbonoxy - 6-methyl-1,3,3a,4,7,7a-hexahydrofuro[3,4-c]-pyridine, converting the latter compound to the 2-methyl-3-hydroxypyridine-4,5-dicarboxaldehyde and then hydrogenating or reducing the 4,5-dicarboxaldehyde compound to yield pyridoxine. The over-all reaction can be structurally illustrated as follows:

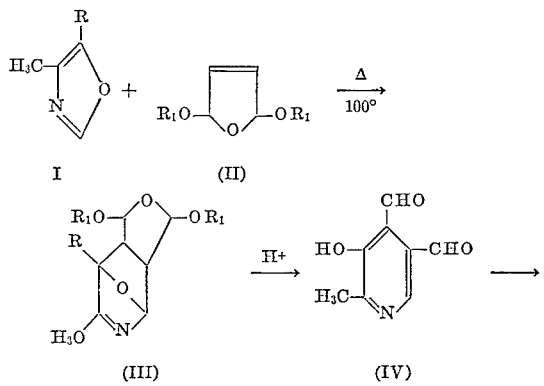

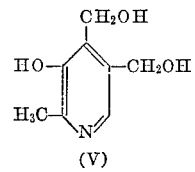

wherein R represents a cyano or a hydrocarbonoxy group and wherein $R_1$ represents a hydrocarbon group.

Thus, in accordance with the foregoing flowsheet, the oxazole (I) is reacted with the 2,5-dihydrocarbonoxy-2,5-dihydrofuran (II) to produce 4,7-epoxy-7-(cyano or hydrocarbonoxy) - 1,3-dihydrocarbonoxy-6-methyl-1,3,3a,4,7,7a - hexahydrofuro-[3,4-c]-pyridine (III). This compound is then hydrolyzed in the presence of a strong inorganic acid to produce 2-methyl-3-hydroxy-4,5-pyridine dicarboxaldehyde (IV) and this latter compound then hydrogenated or reduced to produce pyridoxine (V).

In the foregoing described reaction, the substituent R on the oxazole moiety of Formula I shown above represents a cyano or hydrocarbonoxy group. The process of this invention can be carried out with a 4-methyl-5-cyano oxazole or with various 4-methyl-5-hydrocarbonoxy oxazoles although with regard to the latter compounds, it is generally preferred to use the oxazole having a hydrocarbonoxy group containing from 1 to 10 carbon atoms, since such compounds are more readily prepared and under optimum conditions produce high yields of the desired substituted pyridine intermediate shown by Formula IV above. Thus, oxazoles wherein the hydrocarbon substituent of the hydrocarbonoxy radical is a lower alkyl group of from 1 to 10 carbon atoms such as methyl, ethyl, isopropyl, butyl, isobutyl, amyl and octyl, a heterocyclic alkyl such as tetrahydrofurfuryl; an aralkyl group such as benzyl, phenyl ethyl and phenyl propyl or an aryl group such as phenyl, tolyl and the like, represent the preferred oxazoles which can be used in the process of the present invention.

The 2,5-dihydrocarbonoxy-2,5-dihydrofuran which is reacted with the oxazole to produce the 4,7-epoxy-4,5-(cyano or hydrocarbonoxy) - 1,3 - dihydrocarbonoxy-6-methyl - 1,3,3a,4,7,7a-hexahydrofuro-[3,4-c]-pyridine can be those compounds of Formula II wherein $R_1$ represents a hydrocarbon group. It is preferable, however, to use those compounds of Formula II wherein $R_1$ represents an alkyl group containing from 1 to 10 carbon atoms, a benzyl group or a phenyl group. Also, $R_1$ can be the same radical or different radicals in each particular compound, although it is preferred to use 2,5-dihydrocarbonoxy-2,5-dihydrofurans of Formula II wherein the $R_1$ substituents are the same in each compound. The reaction of the oxazole and the 2,5-dihydrocarbonoxy-2,5-dihydrofuran is effected by intimately contacting a mixture of the reactants for a sufficient time to produce the bridged oxygen adduct (III). This reaction can be carried out at temperatures from about 50° C. to about 150° C. although it is preferable to carry out the reaction at a temperature of 80–135° C. The formation of the bridged oxygen adduct (III) can be accomplished in the presence of a suitable inert solvent such as tetrahydrofuran, dioxane and the like, although the presence of a solvent is not essential in carrying out the process of this invention. The bridged oxygen adduct formed can then be isolated by procedures known in the art, for example, extraction with a suitable organic solvent such as hexane and concentration of the solvent extract, to yield the desired adduct. This adduct can then be further purified by chromatography.

Once the bridged oxygen adduct is obtained it can be converted in high yield to 2-methyl-3-hydroxypyridine- 4,5-dicarboxaldehyde (IV). This conversion is accomplished by an aqueous hydrolysis which can be carried out in the presence of a strong inorganic acid such as sulfuric acid or hydrochloric acid. The 2-methyl-3-hydroxypyridine-4,5-dicarboxaldehyde can then be isolated by procedures known in the art, or preferably the hydrolysis solution containing the 2-methyl-3-hydroxypyridine-4,5-dicarboxaldehyde can be immediately subjected to a reduction to effect its conversion to vitamin $B_6$. Thus, the reduction of the 2-methyl-3-hydroxypyridine-4,5-dicarboxaldehyde can be accomplished by a hydrogenation such as by dissolving the pyridine dicarboxaldehyde in a suitable solvent such as water or an alkanol such as methanol or ethanol and introducing hydrogen gas into the reactant solution under moderate pressures such as between about atmospheric pressure and 1000 p.s.i.g. hydrogen gas pressure in the presence of a suitable hydrogenation catalyst such as, for example, Raney nickel or a noble metal catalyst such as palladium-on-carbon. The hydrogenation is complete when the uptake of hydrogen gas ceases and upon completion of the reaction, the pyridoxine produced can be isolated by filtering off the catalyst and concentrating the reaction solution under reduced pressure.

Alternatively, the reduction of the 2-methyl-3-hydroxypyridine-4,5-dicarboxaldehyde can be effected by treating the pyridine dicarboxaldehyde compound with a suitable reducing agent such as lithium aluminum hydride, sodium borohydride and the like. Thus, the dicarboxaldehyde can be dissolved in an appropriate solvent such as tetrahydrofuran and then subjected to the reduction by the addition of a suitable reducing agent to this solution. The reaction is carried out for a sufficient time to complete the reduction and once completed, the pyridoxine produced can be isolated according to standard methods.

In a preferred embodiment of this invention, the 2-methyl-3-hydroxy-4,5-pyridine dicarboxaldehyde can be dissolved in methanolic hydrogen chloride and this solution then subjected to a reduction as described above to produce pyridoxine hydrochloride directly.

Following are examples which illustrate this invention. They are intended to be illustrations of the invention and not limitations thereof.

Example 1.—Preparation of 4,7-epoxy-7-ethoxy-1,3-dimethoxy-6-methyl-1,3,3a,4,7,7a-hexahydrofuro-[3,4-c]-pyridine A mixture of 3.45 grams (0.0271 moles) of 4-methyl-5-ethoxyoxazole and 10.35 grams (0.0795 mole) of 2,5-dimethoxy-2,5-dihydrofuran is heated in a sealed tube at 100° C. for approximately 41 hours. Unreacted starting material is removed under reduced pressure and an aliquot of the resulting solution is then cooled and seeded with a small amount of pure 4,7-epoxy-7-ethoxy-1,3-dimethoxy-6-methyl-1,3,3a,4,7,7a-hexahydrofuro-[3,4-c]-pyridine. The precipitated 4,7-epoxy-7-ethoxy-1,3-dimethoxy-6-methyl-1,3,3a,4,7,7a-hexahydrofuro-[3,4-c]-pyridine is then isolated by filtration. The 4,7-epoxy-7-ethoxy-1,3-dimethoxy-6-methyl-1,3,3a,4,7,7a-hexahydrofuro-[3,4-c]-pyridine has a melting point of 112–114° C. The isomer of the above compound has a melting point of 76°–79° C.

Following the procedure of the above example but using other 4-methyl-5-alkoxy oxazoles such as 4-methyl-5-isopropoxy oxazole or 4-methyl-5-amyloxy oxazoles or other 4-methyl-5-substituted oxazoles such as the 4-methyl-5-cyano oxazole, the 4-methyl-5-benzyloxy oxazole, the 4-methyl-5-tetrahydrofurfuryloxy oxazole or the 4-methyl-5-phenoxy oxazole in place of 4-methyl-5-ethoxy oxazole there is obtained 4,7-epoxy-7-(isopropoxy, amyloxy, cyano, benzyloxy, tetrahydrofurfuryloxy or phenoxy)-1,3-dimethoxy-6-methyl-1,3,3a,4,7,7a-hexahydrofuro-[3,4-c]-pyridine respectively.

Similarly, following the procedure of the above example but using 2,5-diethoxy-2,5-dihydrofuran, 2,5-diisopropoxy-2,5-dihydrofuran, 2,5-dihexyloxy-2,5-dihydrofuran, 2,5-dibenzyloxy-2,5-dihydrofuran or 2,5-diphenoxy-2,5-dihydrofuran in place of 2,5-dimethoxy-2,5-dihydrofuran there is produced 4,7-epoxy-7-ethoxy-1,3-di(ethoxy, isopropoxy, hexyloxy, benzyloxy or phenoxy)-6-methyl-1,3,3a,4,7,7a-hexahydrofuro-[3,4-c]-pyridine respectively.

Example 2.—Preparation of 2-methyl-3-hydroxy-4,5-pyridine dicarboxaldehyde

A 0.5 ml. aliquot of the reaction mixture obtained according to Example 1 at the point after unreacted starting material was removed under reduced pressure was heated with 25.0 ml. of 0.1 N hydrochloric acid at 80° C. for two hours. The 2-methyl-3-hydroxy-4,5-pyridine dicarboxaldehyde produced was then utilized "as is" in the reduction part of this invention.

Example 3.—Preparation of pyridoxine hydrochloride

A 1 g. sample of crude 4,7-epoxy-7-ethoxy-1,3-dimethoxy-6-methyl-1,3,3a,4,7,7a-hexahydrofuro-[3,4-c]-pyridine is hydrolyzed in 0.1 N hydrochloric acid at 80° C. for 2 hours as in Example 2. The mixture was then diluted to 100 ml. with water and neutralized with sodium bicarbonate. The solution was shaken at 25° C. for 4 hours under 2–3 atmospheres of hydrogen gas pressure with 1 gm. of Raney nickel catalyst in a hydrogenation bomb. The catalyst was removed by filtration and the filtrate concentrated under reduced pressure to a small volume. The concentrated solution was then acidified with hydrochloric acid and the remaining solvent was removed under reduced pressure. The residue was extracted with alcoholic ammonia and pyridoxine hydrochloride was isolated from the extract by evaporation to remove ammonia and tritration with ethanolic hydrogen chloride. The pyridoxine hydrochloride obtained melted at 207–208° C. and did not depress the melting point of an authentic sample. The identity of pyridoxine hydrochloride was further confirmed by paper chromatography in a borate buffer.

EXAMPLE 4.—Preparation of pyridoxine hydrochloride

A 1 g. sample of 4,7-epoxy-7-ethoxy-1,3-dimethoxy-6-methyl-1,3,3a,4,7,7a-hexahydrofuro-[3,4-c]-pyridine was hydrolyzed with 0.1 N hydrochloric acid at 80° C. for 2 hours, as in Example 2. The resulting solution was diluted to 100 ml. with water and neutralized with sodium bicarbonate. The solution was then taken to dryness under reduced pressure and the residue extracted with 15 ml. of tetrahydrofuran. The tetrahydrofuran extracts were dried over magnesium sulfate. Lithium aluminum hydride (2.0 grams) in 25 cc. of dry ethyl ether was slowly added at 0° C. with stirring under anhydrous conditions in an atmosphere of nitrogen to the dried tetrahydrofuran extracts. After the addition was complete, the reaction mixture was stirred for 30 minutes. Excess lithium aluminum hydride was decomposed by the slow addition of 20 ml. of absolute ethanol followed by 10 ml. of 30% hydrochloric acid. The solution was filtered and the product isolated from the resulting mixture was shown to be vitamin $B_6$ hydrochloride by the melting point, mixed melting point and paper chromatographic technique as explained in Example 3.

What is claimed is:

1. A process for the preparation of pyridoxine which comprises the steps of
(1) reacting an oxazole of the formula:

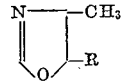

wherein R is a cyano group or a hydrocarbonoxy group of the formula OX wherein X is alkyl having 1 to 10 carbon atoms, tetrahydrofurfuryl, benzyl, phenyl ethyl, phenyl propyl, phenyl or tolyl with a compound of the formula

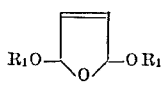

wherein $R_1$ is alkyl having 1 to 10 carbon atoms, phenyl or benzyl, to produce a compound of the formula

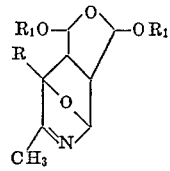

wherein R and $R_1$ are as above;

(2) hydrolyzing the compound produced according to step (1) with a strong aqueous inroganic acid to produce a compound of the formula:

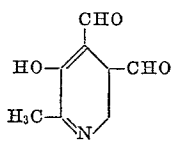

(3) hydrogenating or reducing the compound produced according to step (2) to yield pyridoxine.

2. A process according to claim 1 wherein X is ethyl and $R_1$ is methyl.

3. A process for the preparation of a compound of the formula

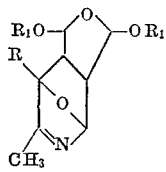

wherein R is a cyano group or a hydrocarbonoxy group of the formula OX wherein X is alkyl having 1 to 10 carbon atoms, tetrahydrofurfuryl, benzyl, phenyl ethyl, phenyl propyl, phenyl or tolyl and $R_1$ is alkyl having from 1 to 10 carbon atoms, phenyl or benzyl, which comprises reacting an oxazole of the formula:

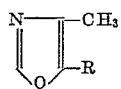

wherein R is as above with a compound of the formula:

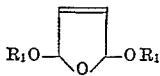

wherein $R_1$ is as above.

4. A process of claim 3 wherein X is ethyl and $R_1$ is methyl.

5. A compound of the formula

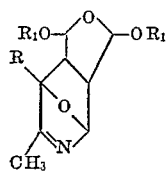

wherein R is a cyano group or a hydrocarbonoxy group of the formula OX wherein X is alkyl having 1 to 10 carbon atoms, tetrahydrofurfuryl, benzyl, phenyl ethyl, phenyl propyl, phenyl or tolyl and $R_1$ is alkyl having from 1 to 10 carbon atoms, phenyl or benzyl.

6. The product of claim 5 wherein X is ethyl and $R_1$ is methyl.

7. A process for the preparation of pyridoxine which comprises reducing a compound of the formula:

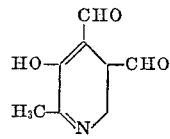

8. A process of claim 7 wherein the reduction is carried out using hydrogen gas in the presence of a hydrogenation catalyst.

9. A process of claim 7 wherein the reduction is carried out by the use of a reducing agent selected from the group consisting of lithium aluminum hydride or sodium borohydride.

10. A process for the preparation of 2-methyl-3-hydroxy-4,5-pyridine dicarboxaldehyde which comprises the steps of (1) reacting an oxazole in the formula:

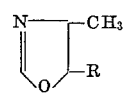

wherein R is a cyano group or a hydrocarbonoxy group of the formula OX wherein X is alkyl having 1 to 10 carbon atoms, tetrahydrofurfuryl, benzyl, phenyl ethyl, phenyl propyl, phenyl or tolyl with a compound of the formula:

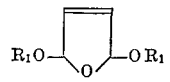

wherein $R_1$ is alkyl having 1 to 10 carbon atoms, phenyl or benzyl, to produce a compound of the formula:

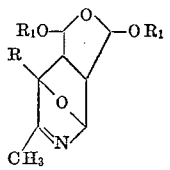

wherein R and $R_1$ are as above; and (2) hydrolyzing the compound produced according to step (1) with a strong aqueous inorganic acid to produce the desired product.

11. The process of claim 10 wherein X is ethyl and $R_1$ is methyl.

References Cited

UNITED STATES PATENTS 3,227,721  1/1966  Pfister et al. _____ 260—297
3,227,724  1/1966  Pfister et al. _____ 260—297

JOHN D. RANDOLPH, *Primary Examiner.*

A. L. ROTMAN, *Assistant Examiner.*